(12) United States Patent
Gupta et al.

(10) Patent No.: US 9,946,940 B2
(45) Date of Patent: Apr. 17, 2018

(54) VEHICLE VISION SYSTEM WITH ADAPTIVE LANE MARKER DETECTION

(71) Applicant: MAGNA ELECTRONICS INC., Auburn Hills, MI (US)

(72) Inventors: Nikhil Gupta, Brampton (CA); Salim Djeziri, Laval (CA); Eduardo R. Corral-Soto, Toronto (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 114 days.

(21) Appl. No.: 14/969,526

(22) Filed: Dec. 15, 2015

(65) Prior Publication Data

US 2016/0180180 A1    Jun. 23, 2016

Related U.S. Application Data

(60) Provisional application No. 62/093,742, filed on Dec. 18, 2014.

(51) Int. Cl.
| | |
|---|---|
| *H04N 9/47* | (2006.01) |
| *H04N 7/18* | (2006.01) |
| *G06K 9/00* | (2006.01) |
| *G06T 7/12* | (2017.01) |
| *G06T 7/181* | (2017.01) |
| *G06K 9/46* | (2006.01) |
| *G06K 9/50* | (2006.01) |

(52) U.S. Cl.
CPC ....... *G06K 9/00798* (2013.01); *G06K 9/4604* (2013.01); *G06K 9/50* (2013.01); *G06T 7/12* (2017.01); *G06T 7/181* (2017.01); *H04N 7/188* (2013.01); *G06T 2207/10016* (2013.01); *G06T 2207/30256* (2013.01)

(58) Field of Classification Search
None
See application file for complete search history.

(56) References Cited

U.S. PATENT DOCUMENTS

| | | |
|---|---|---|
| 4,600,913 A | 7/1986 | Caine |
| 4,907,870 A | 3/1990 | Brucker |
| 4,971,430 A | 11/1990 | Lynas |
| 5,097,362 A | 3/1992 | Lynas |
| 5,177,685 A | 1/1993 | Davis et al. |
| 5,189,561 A | 2/1993 | Hong |
| 5,424,952 A | 6/1995 | Asayama |
| 5,500,766 A | 3/1996 | Stonecypher |

(Continued)

*Primary Examiner* — Talha M Nawaz
(74) *Attorney, Agent, or Firm* — Honigman Miller Schwartz and Cohn, LLP

(57) ABSTRACT

A vision system of a vehicle includes a camera configured to be disposed at a vehicle so as to have a field of view exterior of the vehicle. An image processor is operable to process image data captured by the camera. The image processor is operable to determine lane markers on a road on which the vehicle is traveling. The image processor processes intensity gradient information of captured image data to determine lane markers, and, responsive to processing of captured image data, the image processor is operable to detect straight or curved lane markers. The image processor is operable to adapt the processing of lane marker image data in subsequent frames of captured image data responsive to image processing of lane marker image data in previous frames of captured image data.

20 Claims, 24 Drawing Sheets

Implementation and use:

A special *dll* library provides the three sets of pixels for central, right and left neighborhood around each point of the image, needed to compute $w_p$.

Here are some typical masks obtained for some typical angles.

White dot: central pixel, blue: central neighborhood, red: right neighborhood, and green: left neighborhood. Notice a gap of one pixel between two neighborhood regions.

(56) References Cited

U.S. PATENT DOCUMENTS

| | | |
|---|---|---|
| 5,521,633 A | 5/1996 | Nakajima et al. |
| 5,550,677 A | 8/1996 | Schofield et al. |
| 5,581,464 A | 12/1996 | Woll et al. |
| 5,642,299 A | 6/1997 | Hardin et al. |
| 5,670,935 A | 9/1997 | Schofield et al. |
| 5,715,093 A | 2/1998 | Schierbeek et al. |
| 5,790,403 A | 8/1998 | Nakayama |
| 5,796,094 A | 8/1998 | Schofield et al. |
| 5,877,897 A | 3/1999 | Schofield et al. |
| 5,884,212 A | 3/1999 | Lion |
| 5,949,331 A | 9/1999 | Schofield et al. |
| 6,097,023 A | 8/2000 | Schofield et al. |
| 6,185,492 B1 | 2/2001 | Kagawa |
| 6,201,642 B1 | 3/2001 | Bos et al. |
| 6,222,447 B1 | 4/2001 | Schofield et al. |
| 6,243,003 B1 | 6/2001 | DeLine et al. |
| 6,278,377 B1 | 8/2001 | DeLine et al. |
| 6,285,393 B1 | 9/2001 | Shimoura et al. |
| 6,313,454 B1 | 11/2001 | Bos et al. |
| 6,317,057 B1 | 11/2001 | Lee |
| 6,320,176 B1 | 11/2001 | Schofield et al. |
| 6,353,392 B1 | 3/2002 | Schofield et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,433,676 B2 | 8/2002 | DeLine et al. |
| 6,485,155 B1 | 11/2002 | Duroux et al. |
| 6,487,501 B1 | 11/2002 | Jeon |
| 6,594,583 B2 | 7/2003 | Ogura et al. |
| 6,823,241 B2 | 11/2004 | Shirato et al. |
| 6,882,287 B2 | 4/2005 | Schofield |
| 6,946,978 B2 | 9/2005 | Schofield |
| 7,004,606 B2 | 2/2006 | Schofield |
| 7,038,577 B2 | 5/2006 | Pawlicki et al. |
| 7,400,236 B2 | 7/2008 | Kade et al. |
| 7,510,038 B2 | 3/2009 | Kaufmann et al. |
| 7,526,103 B2 | 4/2009 | Schofield et al. |
| 7,532,981 B2 | 5/2009 | Kataoka |
| 7,557,732 B2 | 7/2009 | Kataoka |
| 7,711,464 B2 | 5/2010 | Kaufmann |
| 7,720,580 B2 | 5/2010 | Higgins-Luthman |
| 7,914,187 B2 | 3/2011 | Higgins-Luthman et al. |
| 8,164,628 B2 | 4/2012 | Stein et al. |
| 8,930,081 B2 | 1/2015 | Bolourchi |
| 9,180,908 B2 | 11/2015 | Van Dan Elzen et al. |
| 9,205,776 B2 | 12/2015 | Turk |
| 9,340,227 B2 | 5/2016 | Bajpai |
| 2002/0003571 A1 | 1/2002 | Schofield et al. |
| 2002/0041229 A1 | 4/2002 | Satoh et al. |
| 2002/0159270 A1 | 10/2002 | Lynam et al. |
| 2002/0169531 A1 | 11/2002 | Kawazoe et al. |
| 2002/0188392 A1 | 12/2002 | Breed et al. |
| 2003/0025597 A1 | 2/2003 | Schofield |
| 2003/0052773 A1 | 3/2003 | Sjonell |
| 2003/0156015 A1 | 8/2003 | Winner et al. |
| 2003/0169522 A1 | 9/2003 | Schofield et al. |
| 2004/0098197 A1 | 5/2004 | Matsumoto et al. |
| 2004/0107035 A1 | 6/2004 | Tange et al. |
| 2004/0183663 A1 | 9/2004 | Shimakage |
| 2004/0230375 A1 | 11/2004 | Matsumoto et al. |
| 2004/0252020 A1 | 12/2004 | Matsumoto et al. |
| 2004/0262063 A1 | 12/2004 | Kaufmann et al. |
| 2005/0015203 A1 | 1/2005 | Nishira |
| 2005/0107931 A1 | 5/2005 | Shimakage et al. |
| 2005/0125125 A1 | 6/2005 | Matsumoto et al. |
| 2005/0125153 A1 | 6/2005 | Matsumoto et al. |
| 2005/0179527 A1 | 8/2005 | Schofield |
| 2005/0273234 A1 | 12/2005 | Rattapon et al. |
| 2005/0273261 A1 | 12/2005 | Niwa et al. |
| 2005/0278096 A1 | 12/2005 | Iwazaki et al. |
| 2006/0030987 A1 | 2/2006 | Akita |
| 2006/0047388 A1 | 3/2006 | Oka et al. |
| 2006/0164514 A1 | 7/2006 | Muramatsu et al. |
| 2007/0091173 A1 | 4/2007 | Kade et al. |
| 2007/0100551 A1 | 5/2007 | Ishikura |
| 2007/0225914 A1 | 9/2007 | Kawazoe et al. |
| 2007/0233343 A1 | 10/2007 | Saito et al. |
| 2007/0233386 A1 | 10/2007 | Saito et al. |
| 2008/0061952 A1 | 3/2008 | Maass |
| 2008/0080740 A1 | 4/2008 | Kaufmann |
| 2008/0183342 A1 | 7/2008 | Kaufmann et al. |
| 2008/0278349 A1 | 11/2008 | Kataoka et al. |
| 2009/0024279 A1 | 1/2009 | Takeda et al. |
| 2009/0085913 A1 | 4/2009 | Sakamoto et al. |
| 2009/0132125 A1 | 5/2009 | Yonezawa |
| 2009/0153360 A1 | 6/2009 | Kim |
| 2009/0284360 A1 | 11/2009 | Litkouhi |
| 2010/0114431 A1 | 5/2010 | Switkes et al. |
| 2010/0121532 A1 | 5/2010 | Urai et al. |
| 2010/0145575 A1 | 6/2010 | Switkes et al. |
| 2010/0182139 A1 | 7/2010 | Chen et al. |
| 2010/0189306 A1* | 7/2010 | Kageyama ......... G06K 9/00798 382/104 |
| 2010/0195908 A1* | 8/2010 | Bechtel ................ H04N 5/213 382/167 |
| 2010/0228420 A1 | 9/2010 | Lee |
| 2011/0231062 A1 | 9/2011 | Kim |
| 2011/0231095 A1 | 9/2011 | Nakada et al. |
| 2012/0050074 A1* | 3/2012 | Bechtel ..................... B60R 1/04 340/988 |
| 2012/0320210 A1 | 12/2012 | Imai et al. |
| 2013/0093888 A1 | 4/2013 | Kim |
| 2013/0144521 A1* | 6/2013 | Mathieu ............... G01C 21/365 701/410 |
| 2013/0173115 A1 | 7/2013 | Gunia et al. |
| 2013/0253767 A1 | 9/2013 | Lee et al. |
| 2013/0293717 A1 | 11/2013 | Zhang et al. |
| 2013/0314503 A1 | 11/2013 | Nix et al. |
| 2014/0176716 A1 | 6/2014 | Wallat et al. |

* cited by examiner

In 2D images, the measures $w_p$ or $b_p$ are taken over all angles to get the maximum value over any orientation $$\begin{cases} w_p = \max_\alpha \{ min(\overline{V_p - V_L}, \overline{V_p - V_R}) \} \\ b_p = \max_\alpha \{ min(\overline{V_L - V_p}, \overline{V_R - V_p}) \} \end{cases} \quad \text{(equation II)}$$

- $w_p$ and $b_p$ have the following properties:

| | Flat surface | Right sided edge | Left sided edge | Trench | groove |
|---|---|---|---|---|---|
| $w_p$ | 0 | 0 | 0 | 0 | $h$ |
| $b_p$ | 0 | 0 | 0 | $h$ | 0 |

- $w_p$ and $b_p$ are certainly sensitive to the width of the lines, how to deal with the width is discussed later.

FIG. 5

Implementation and use:

A special *dll* library provides the three sets of pixels for central, right and left neighborhood around each point of the image, needed to compute $w_p$.

Here are some typical masks obtained for some typical angles.

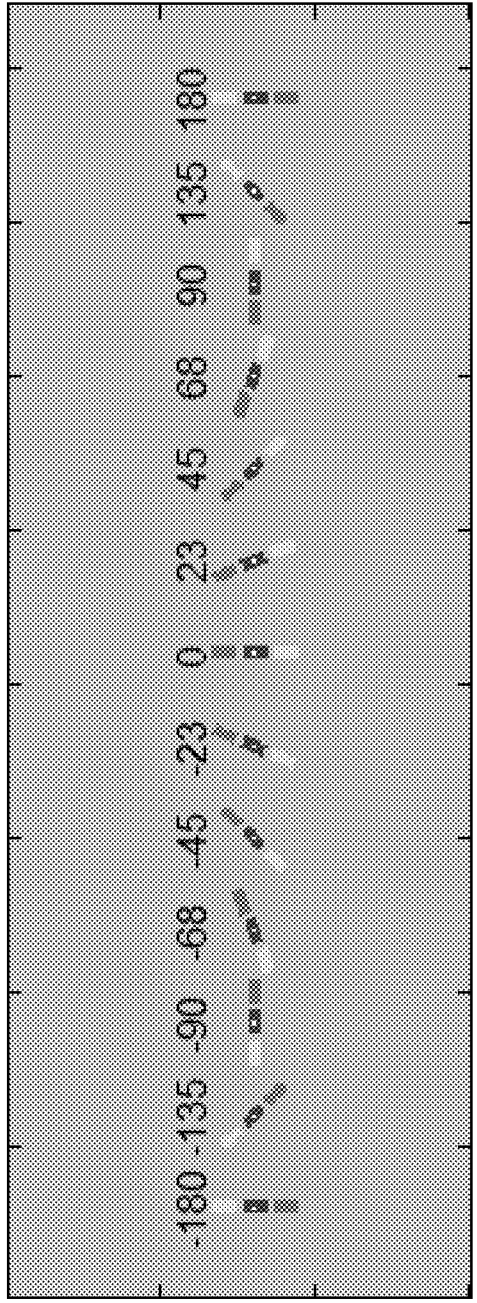

White dot: central pixel, blue: central neighborhood, red: right neighborhood, and green: left neighborhood. Notice a gap of one pixel between two neighborhood regions.

FIG. 6

The function of the library takes 3 arguments:

- alpha, the angle of the line profile
- mskX, the size in X direction, i.e. along alpha direction
- mskY, the size along the Y direction, i.e. the direction that is perpendicular to alpha direction.

To avoid artifacts related to rotation (*):

1. First a mask for angle =0, is generated.
2. The polygon defined by the extremities $P_1P_2P_3P_4$ is rotated.
3. The pixels inside the rotated polygon are then extracted to define the coordinates of pixels of the mask.

(*) mostly missing pixels.

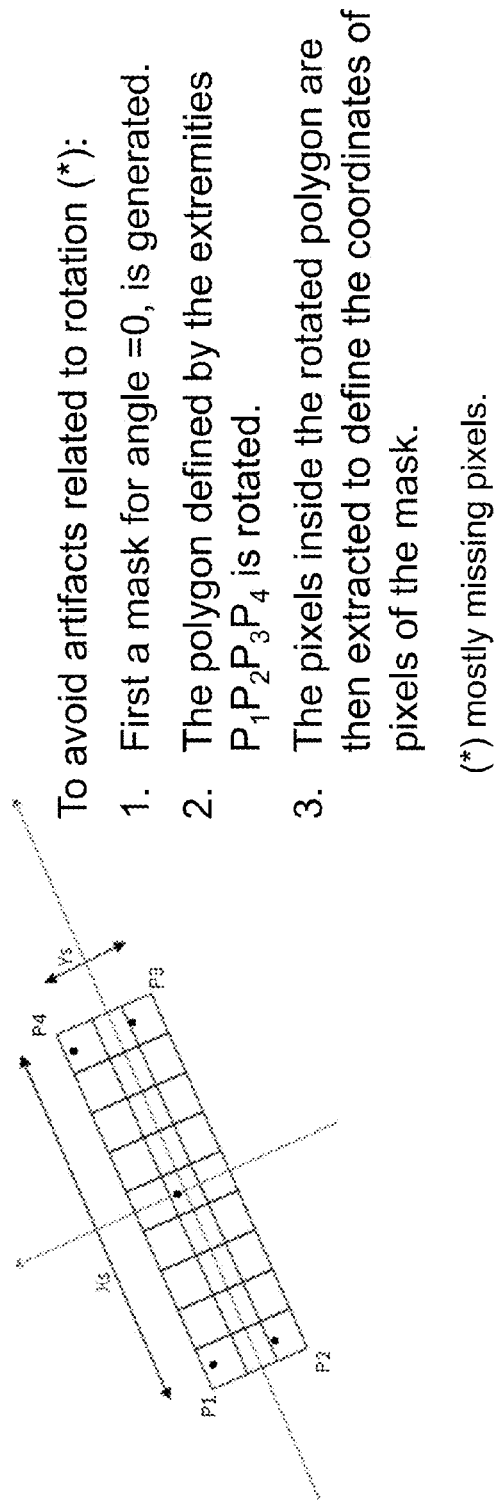

FIG. 7

Focusing on some typical angles: -45, 0, 45, 90°
on Top view image
Mask size: Xs =2, Ys = 1.

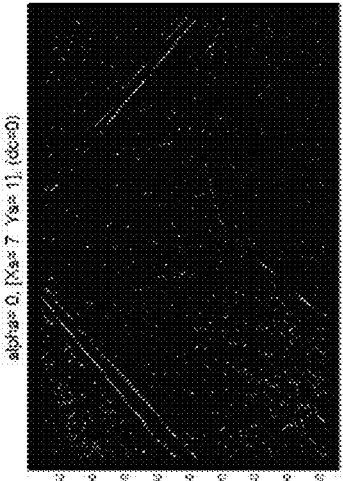
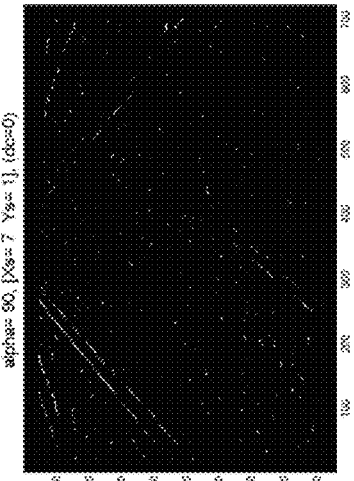
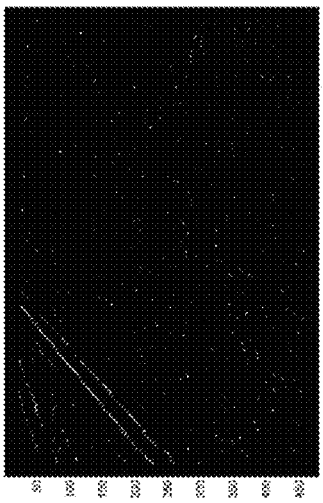
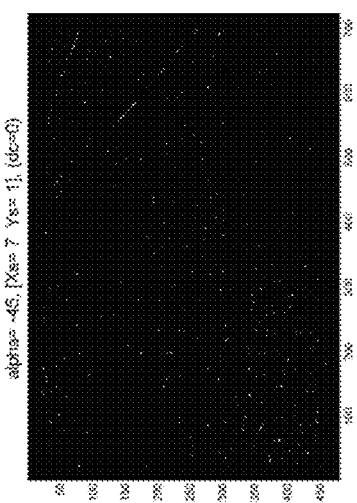
FIG. 11
Focusing on some typical angles: -45, 0, 45, 90°
on *Corrected* image
Mask size: Xs =7, Ys = 1.

Dealing with "all" typical angles: -45, 0, 45, 90°, (Applying equation II)
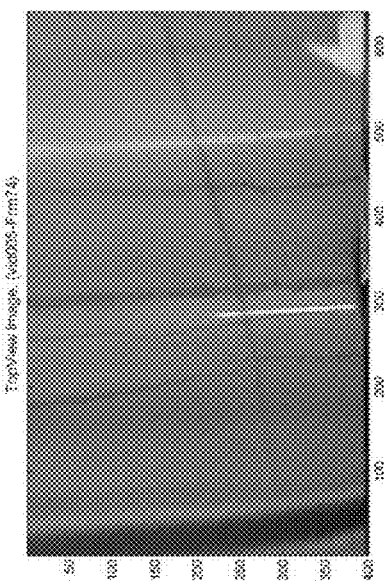
FIG. 13
Focusing on one angle 0° only, (Vertical).
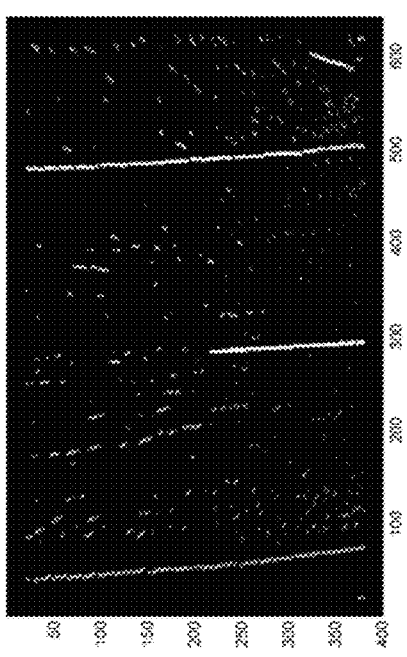
Taking the maximum contrast in the four angles
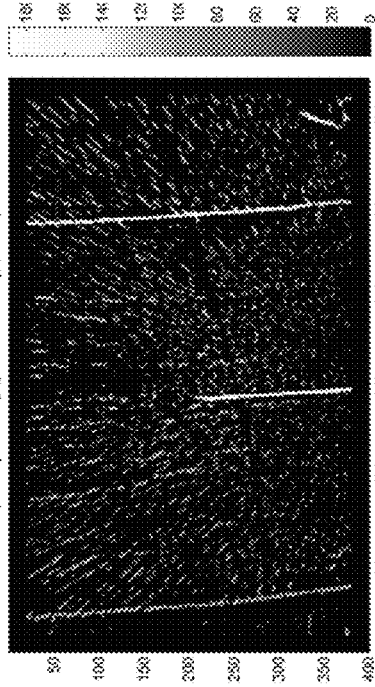

Image contrast vs Image from contrast.
For pixels with positive $w_p$ (not null), replacing wp value by the gray value provides better means for quality evaluation of lines (resA)
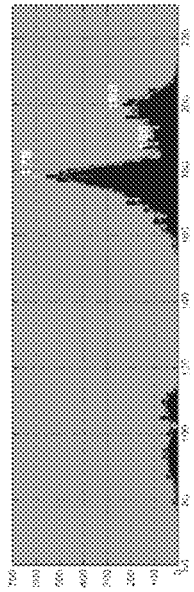
When considering the distribution of resA image → the good lines constitute the rightmost lobe.
FIG. 15
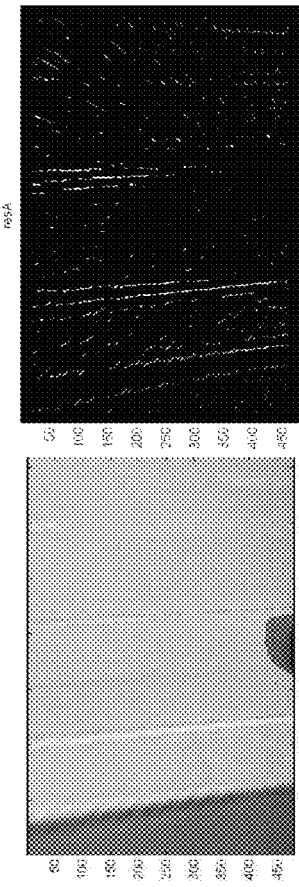
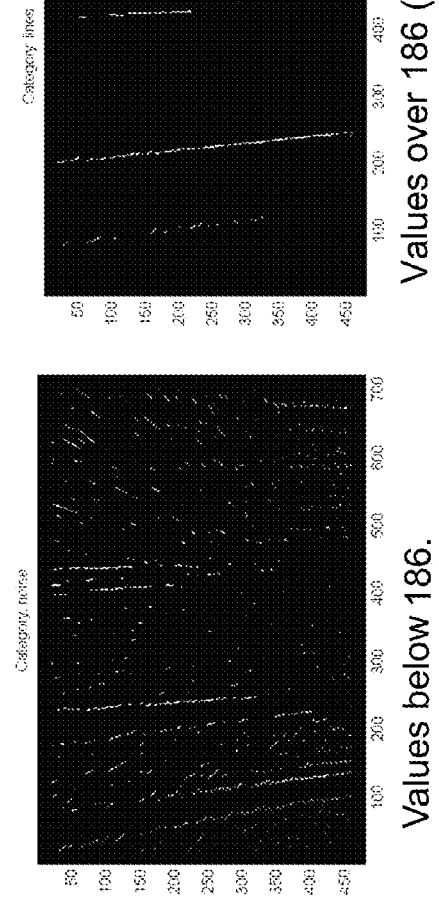
Values over 186 (rightmost lobe)
Values below 186.

Example with other parameter values (for same previous image)

FIG. 16

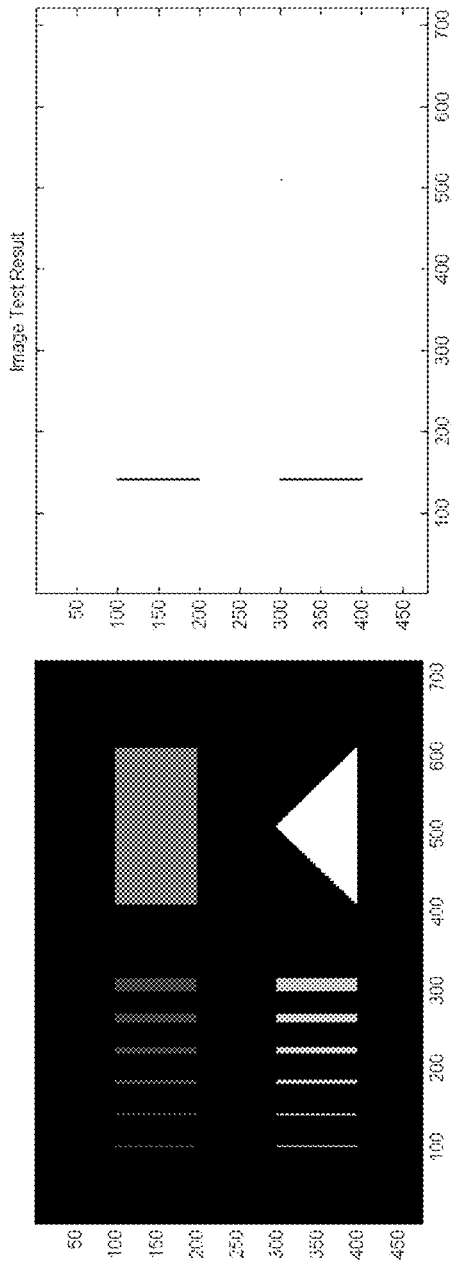

Synthetic image composed of different lines of different thicknesses, a rectangle and a triangle.
- The set of lines are composed of two categories of brightness.
- Witdh = 1, 3, 5, 7, 9, 15 pixels.

Result when applying $w_p$ measure with a thickness value of 3:
- The square and triangle are not detected (contrary to a standard edge detector).
- As expected only one width line has been detected (width=3).

FIG. 18

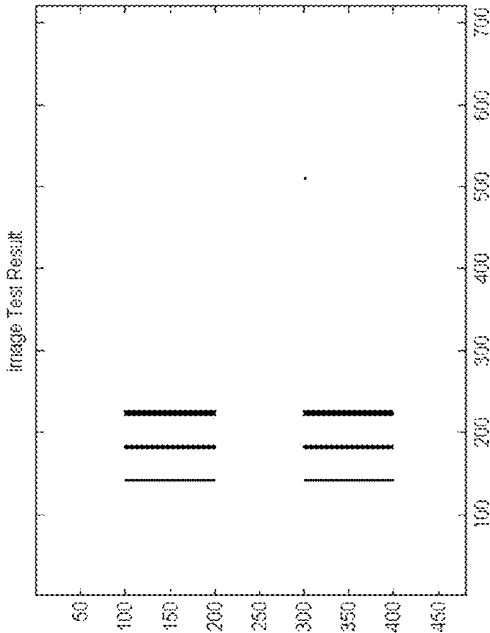

To detect all lines in synthetic image, we may use "Adaptive filiformity measure", which has been used for only vertical lines because it requires special implementation.

Result from adaptive measure for width = [1 - 5]

Note that the results underwent a process of "thickening" based on directional dilation intended to retrieve the original thickness.

(Otherwise each line will be represented by only its median line of 1 pixel width)

FIG. 19

Bounding boxes of edgels

For now, only "Canonical Rectangle" have been implemented instead of "Envelope Rectangle" which can have any direction other than vertical or horizontal.

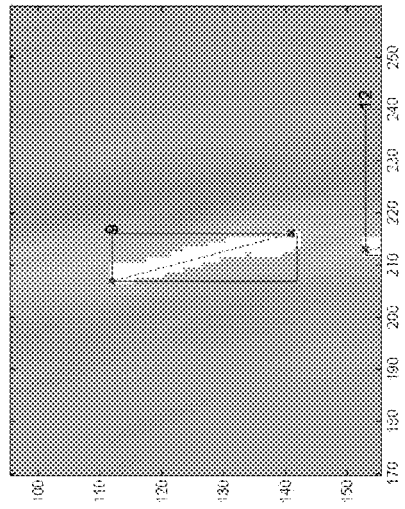

The slope of the approximating line of the set of pixels composing the edgel is shown in red color. Unfortunately the slope of an edgel cannot be used to describe correctly a feature of an edgel. Like this one is obviously vertical, but the slope is not.

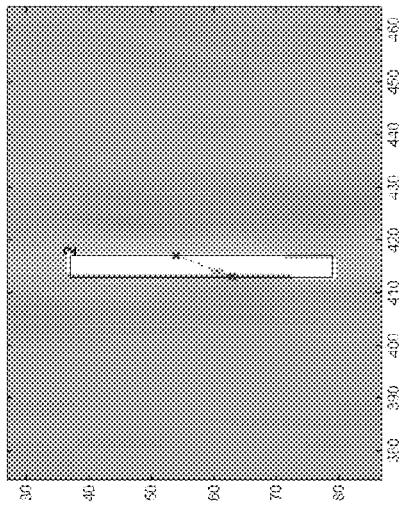

Regrouping Edgels to form lines

Here is a simple way that seems efficient enough to derive the direction of the line(s) on the road:

- The regrouping procedure regards the bounding boxes.
- Let $B_1$ and $B_2$ two boxes, each one characterized by its center $C$ $(C_x, C_y)$ and its horizontal width $w$.
- if the gap in X direction between centers is less than the value of the larger width of both boxes → $B_1$ and $B_2$ are grouped.
- The procedure is applied for each box to see if it can be grouped with another.

Example of regrouping:

- Group 1 (blue): composed of boxes: 9, 12 and 15.

- Group 2 (green): composed of box 2 alone.

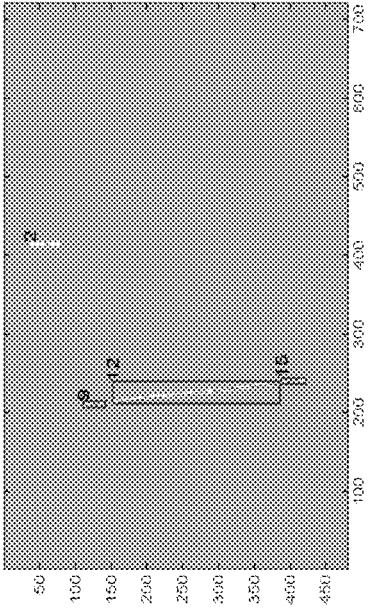

Approximating group of edgels by lines is done using linear regression considering pixels of all edgels composing the group:

$$\hat{y} = b_0 + b_1 x$$

$$\begin{cases} b_1 = \Sigma\,[\,(xi - x)(yi - y)\,] \,/\, \Sigma\,[\,(xi - x)2\,] \\ b_0 = y - b_1 * x \end{cases}$$

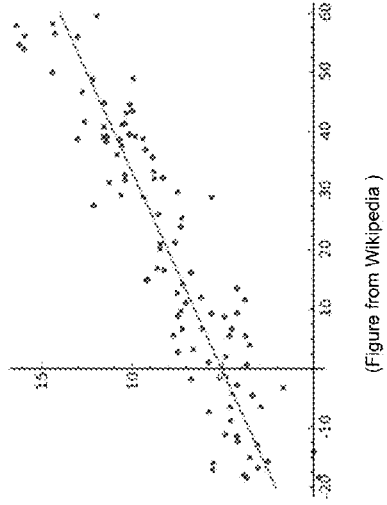

(Figure from Wikipedia)

- The pValue of each approximation is implemented to evaluate the quality of the fitting.
- For bad pValues (over 0.01 in our cases, not 0.05 as in general standard use), this means the group is badly constituted or some of boxes have to be removed.

FIG. 23

We can see 3 groups of lines, each group colored in its own color: magenta, yellow and blue, (pval = 0.005 for each group.)
The color of all lines are green, which mean no intersection with the warning region, defined by two vertical black lines, otherwise the one that intersects that region shall be red.

VEHICLE VISION SYSTEM WITH ADAPTIVE LANE MARKER DETECTION

CROSS REFERENCE TO RELATED APPLICATION

The present application claims the filing benefits of U.S. provisional application Ser. No. 62/093,742, filed Dec. 18, 2014, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a way of extracting line segments from captured image data for road marking detection. The method of the present invention extracts line segments on road surfaces for the purpose of identifying either the lane markings or the park line markings.

Typically, the lane markings are extracted using gradient processing followed by Hough transform or via the use of training. Both of these processes tend to be computationally expensive and have limitations on the kind of markings which could be extracted without generalization (straight vs curved, black vs white, and/or the like). The method of the present invention addresses these concerns by proposing a unified method which can extract black as well as white lines, where the lines could be either curved or straight.

Given that the system uses a wide angle field of view camera that captures images or image data for processing, even straight lines could look either curved or straight depending on where in the field of view and image they lie. Thus, a harmonized approach which can extract curvature as well as straight edges simultaneously is advantageous.

Computationally also, the method of the present invention is cheaper and would yield to easier implementation on the hardware, thus making it favorable for embedded applications.

These and other objects, advantages, purposes and features of the present invention will become apparent upon review of the following specification in conjunction with the drawings.

BRIEF DESCRIPTION OF THE DRAWINGS

FIG. 5 is a table showing the properties of the edges of the band lines;

FIG. 6 shows a library of sets of three pixels for typical masks obtained for some angles;

FIG. 7 shows how a mask is rotated to extract pixels to define coordinates of pixels of a mask;

FIG. 11 shows corrected top view images of FIG. 9;

FIGS. 13 and 14 show images after applying the equation of FIG. 4 and taking a maximum contrast;

FIGS. 15-17 show images of image contrast and image from contrast;

FIG. 18 shows a synthetic image composed of different lines and shapes;

FIG. 19 shows use of an adaptive filiformity measure to detect lines in the synthetic image of FIG. 18;

FIG. 21 shows application of the bounding boxes of detected edgels;

FIG. 22 shows how the edgels are regrouped to form lines;

FIG. 23 shows how groups of edges are approximated by lines using linear regression.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
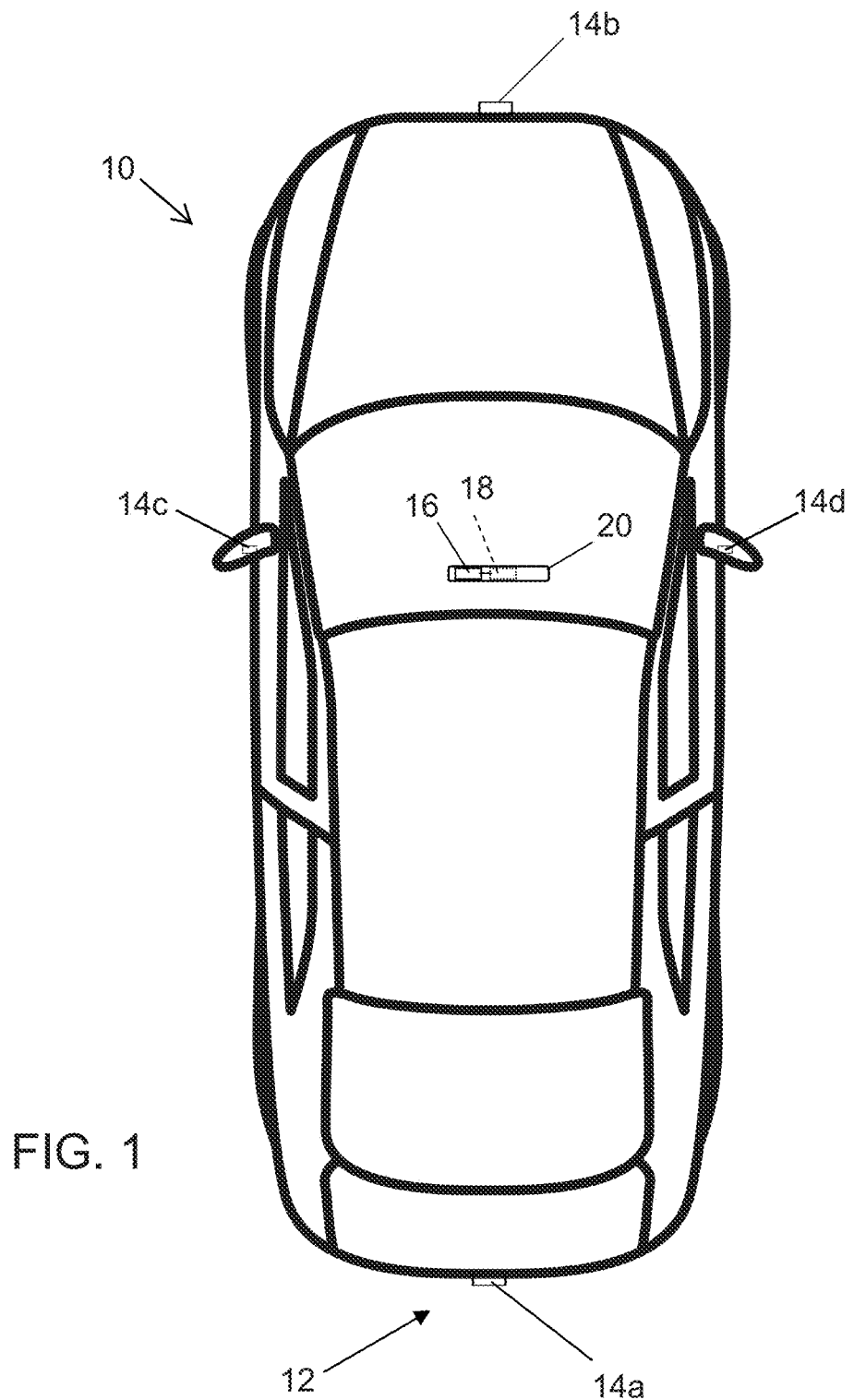
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a lane detection system that processes image data captured by a camera of a vehicle, such as a forward viewing camera that captures image data of the area and road ahead of the vehicle. The system processes the captured image data to extract lane marker or road marker information, and may be operable to detect straight and curved road markers (such as may be encountered along a curve in the road), and may be operable to detect different color or different intensity markers, such as by utilizing the processing system and algorithms and equations and means as described in the attached figures.

The system determines contrasts at both sides of a center point or region of a detected marker or line or gradient at the road surface, and using those contrast values over a plurality of angles or all angles, determines the maximum value over any orientation. The system may utilize a table or database of values for the central, left and right neighborhood for typical angles of a segment, and may determine the angle of the detected segment by matching the determined values with the database values. The system can focus on one or more main directions and may extract lines related to that predefined direction, and/or the system may consider a plurality of directions and extract curved or curvy or serpentine lines.

The method or system of the present invention is operable to process captured image data of a road ahead of a vehicle to extract information used for detecting road markings or lane markings on the road ahead of vehicle. The line extraction is implemented within the actual LDW framework, replacing some modules like the Prewitt, the Hough transform, the Normalized matching model and/or the like. The processor may have a speed that lies in [14, 20] fps in debug mode depending on the implementation. The system may not make an objective comparison, since some modules are still missing, like the line stabilizer, the training and/or the like. The method or system of the present invention is more suitable to extract curved or curvy lines than other methods or systems using Hough transform. The method or system of the present invention also has the potential to focalize on white only lines, black only lines, or both kinds of lines.

Figure 2:
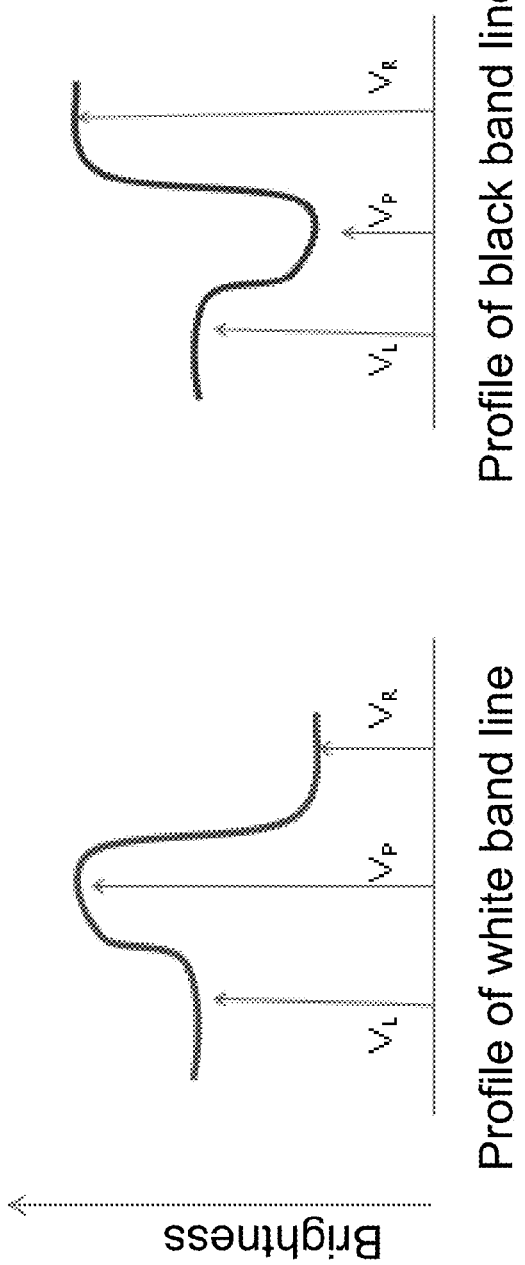
FIG. 2 shows topology profiles of white and black band lines on a road.
Figure 3:
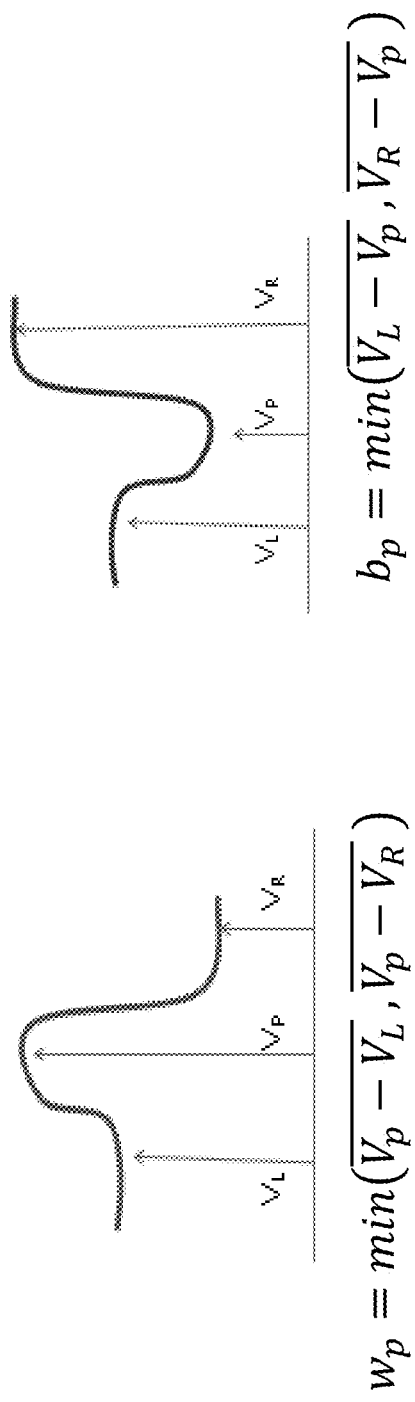
FIG. 3 shows the topology profiles of FIG. 2, and shows equations for measuring the contrasts at both sides of the band lines.
Figure 4:
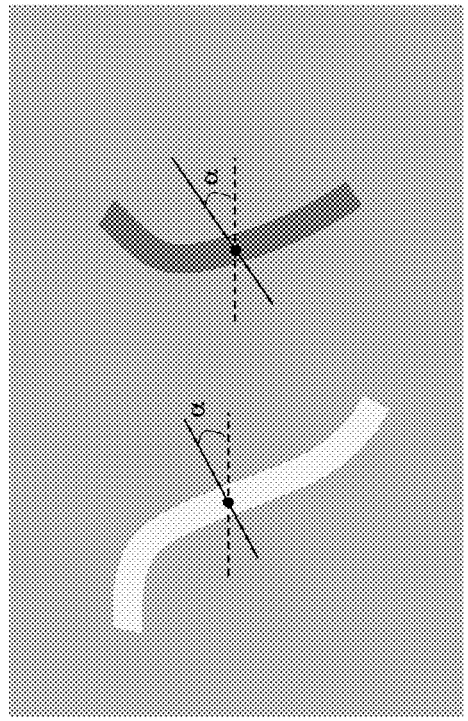
FIG. 4 shows use of the equations of FIG. 3 applied over all angles to obtain a maximum value.
Figure 8:
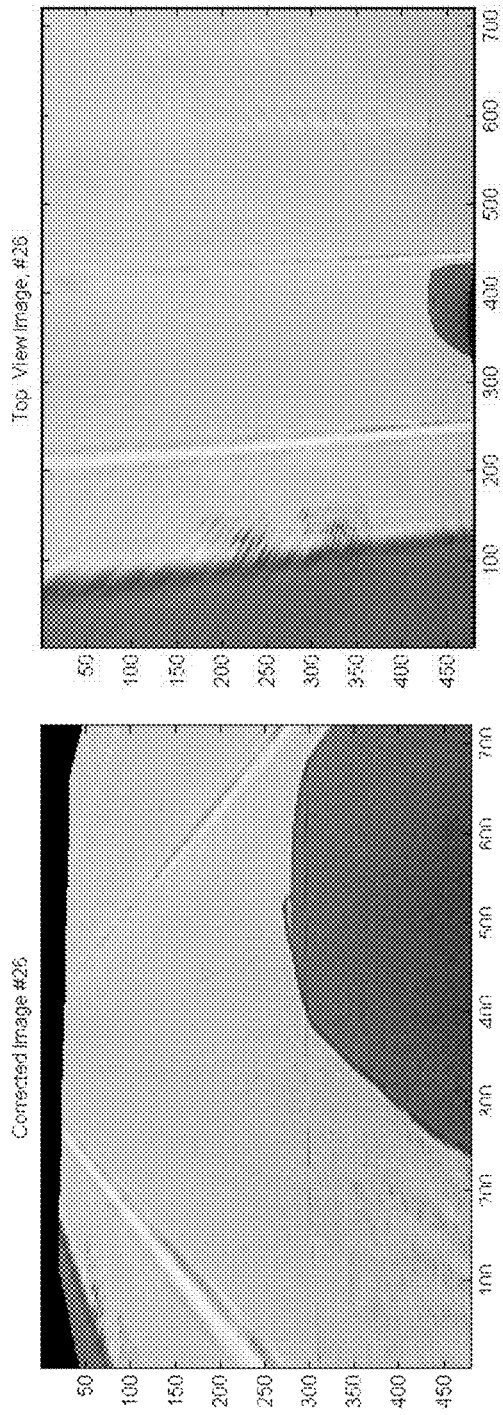
FIG. 8 shows application using typical angles and two kinds of images.
Figure 9:
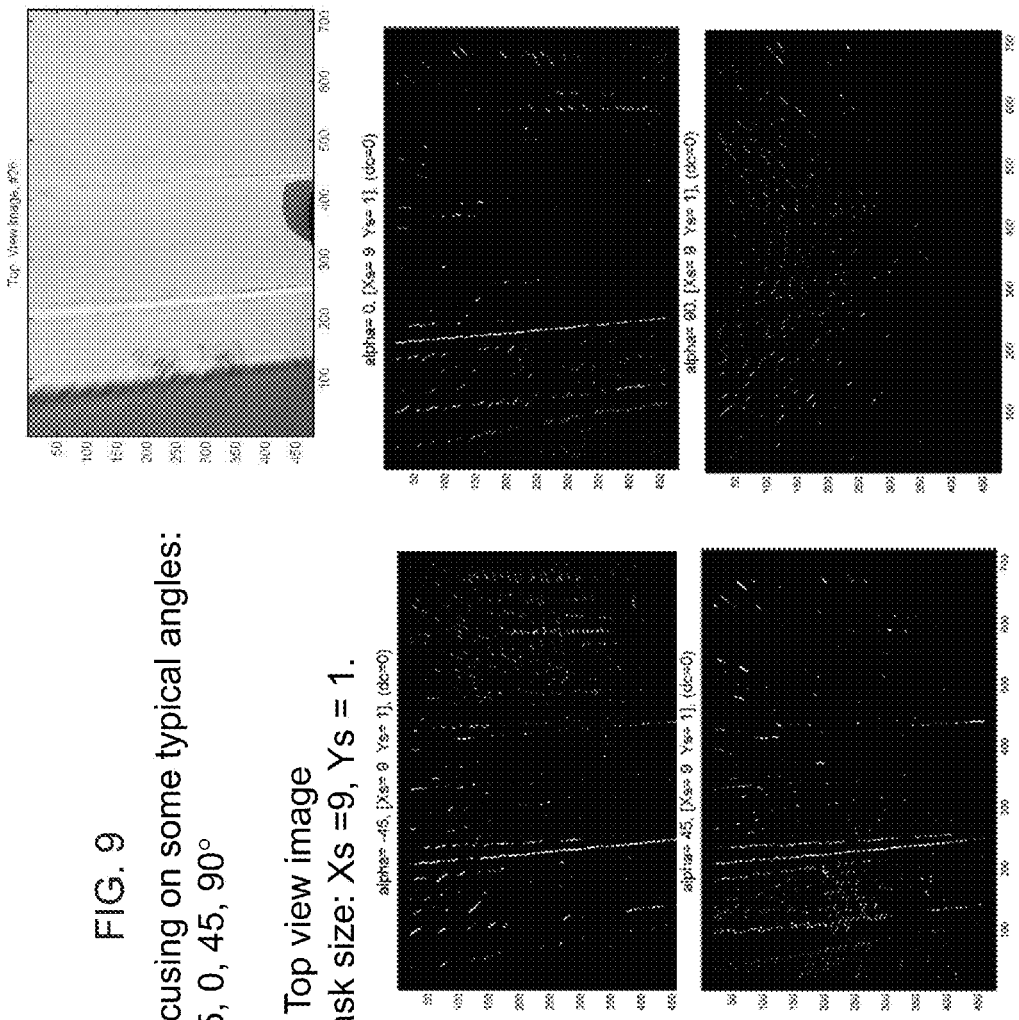
FIG. 9 shows top view images using a mask size Xs=9 and Ys=1.
Figure 10:
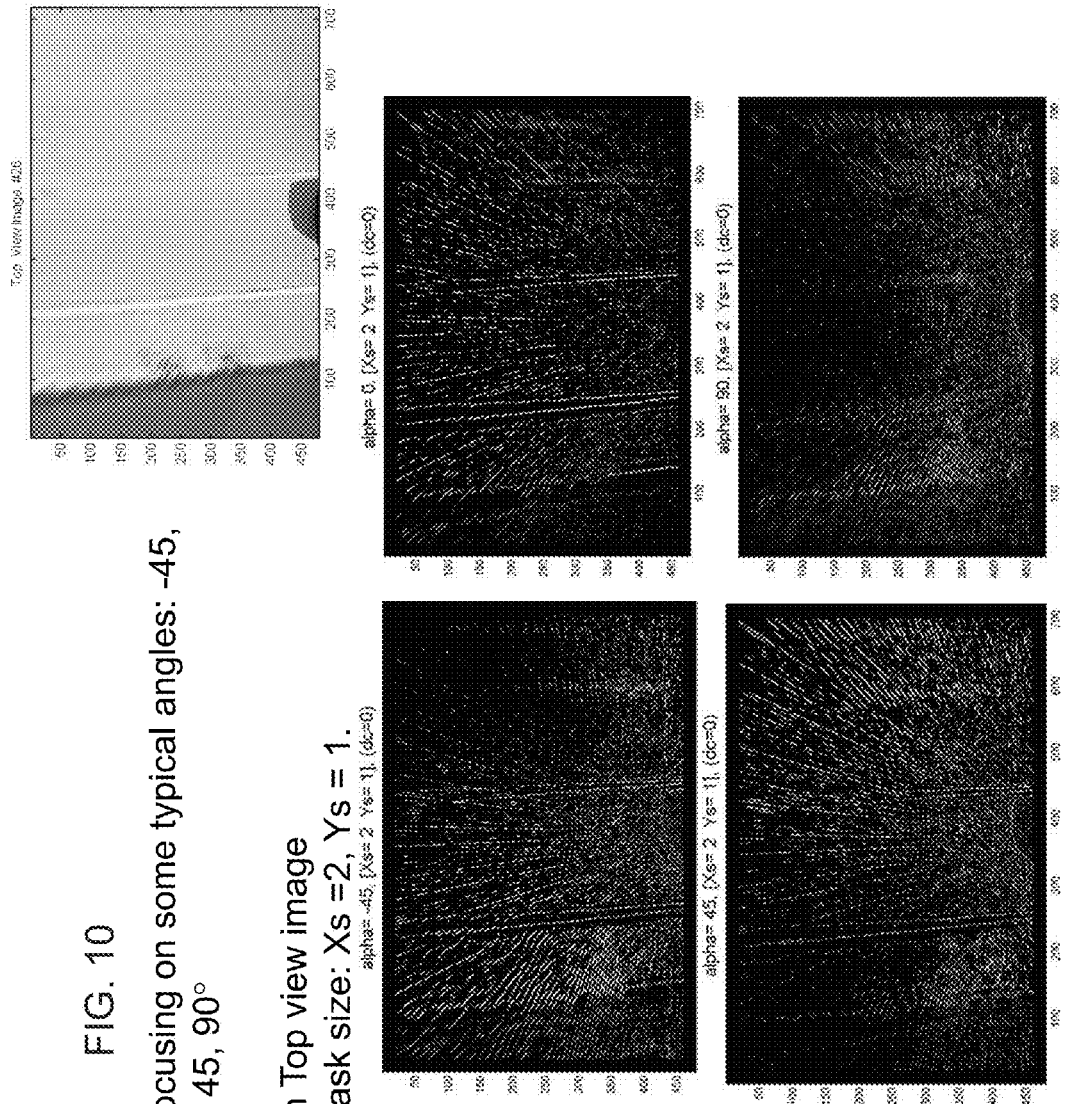
FIG. 10 shows top view images using a mask size Xs=2 and Ys−1.
Figure 12:
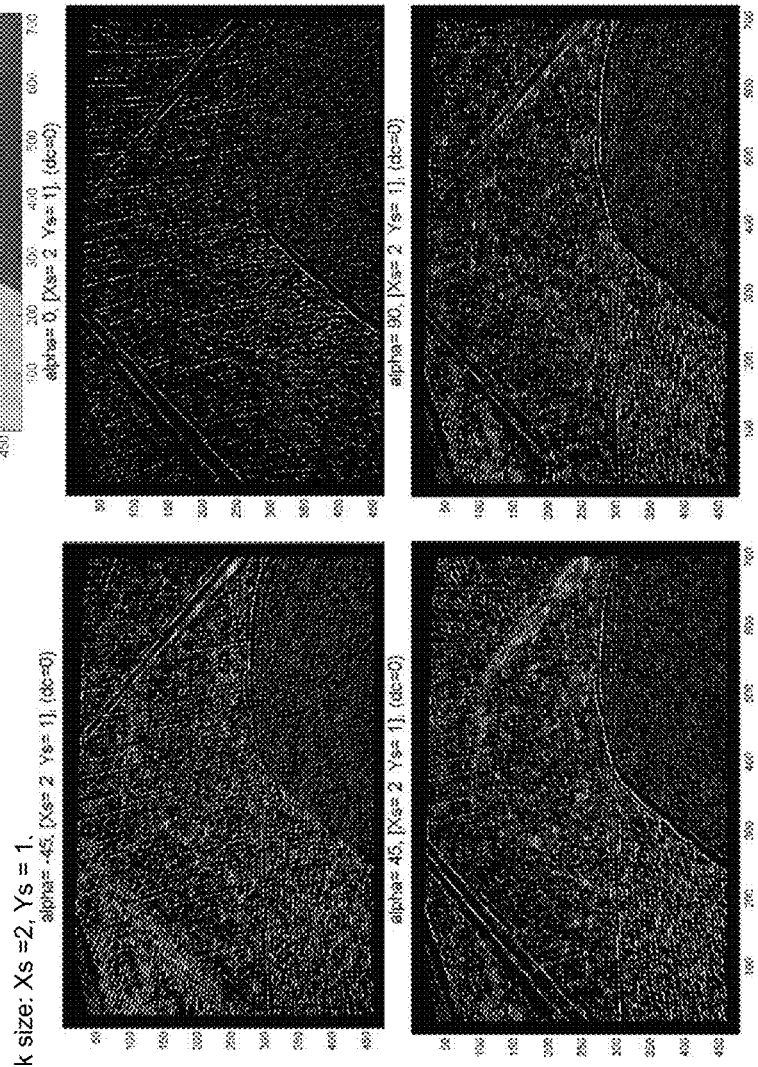
FIG. 12 shows corrected top view images of FIG. 10.
Figure 14:
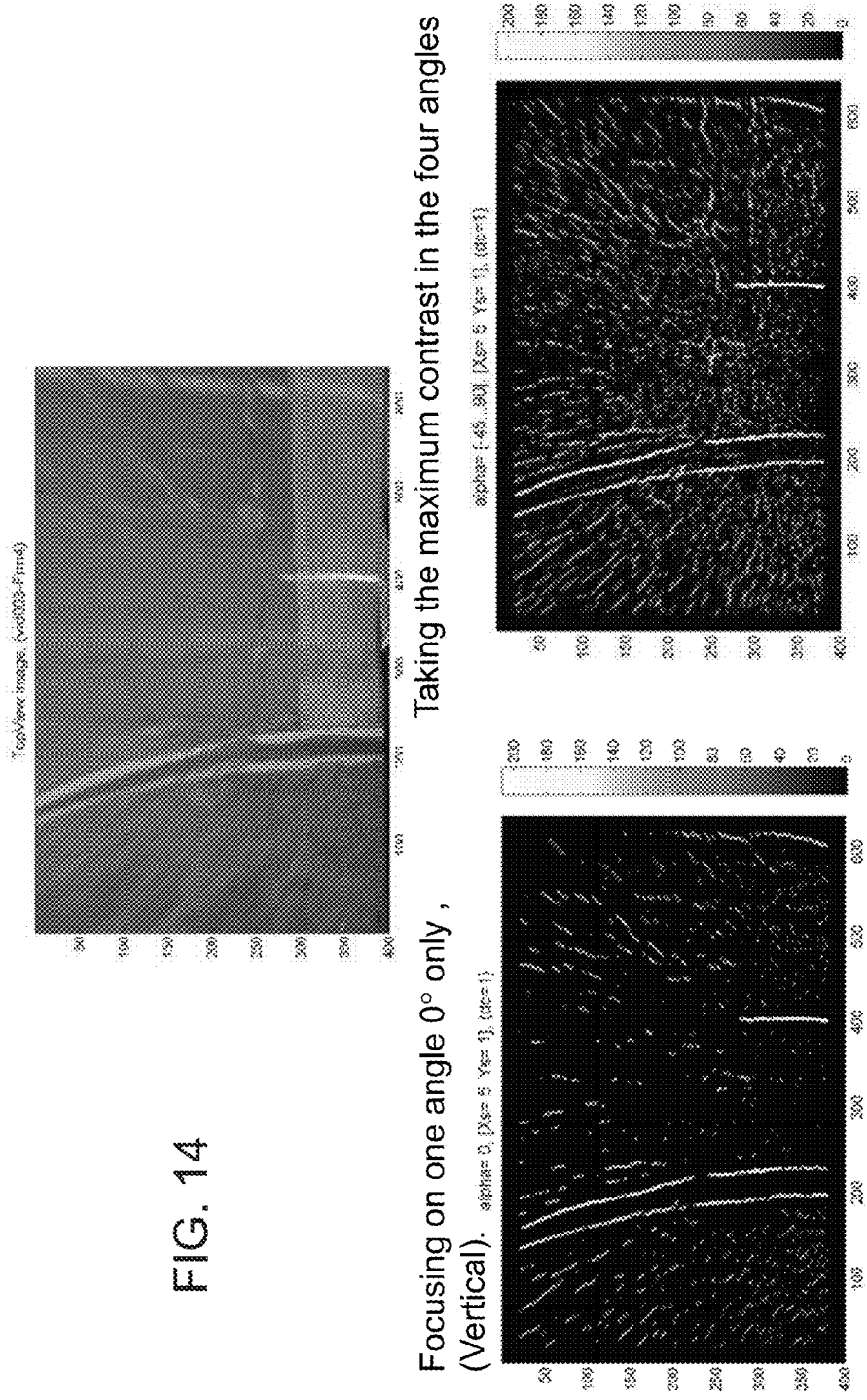
Figure 17:
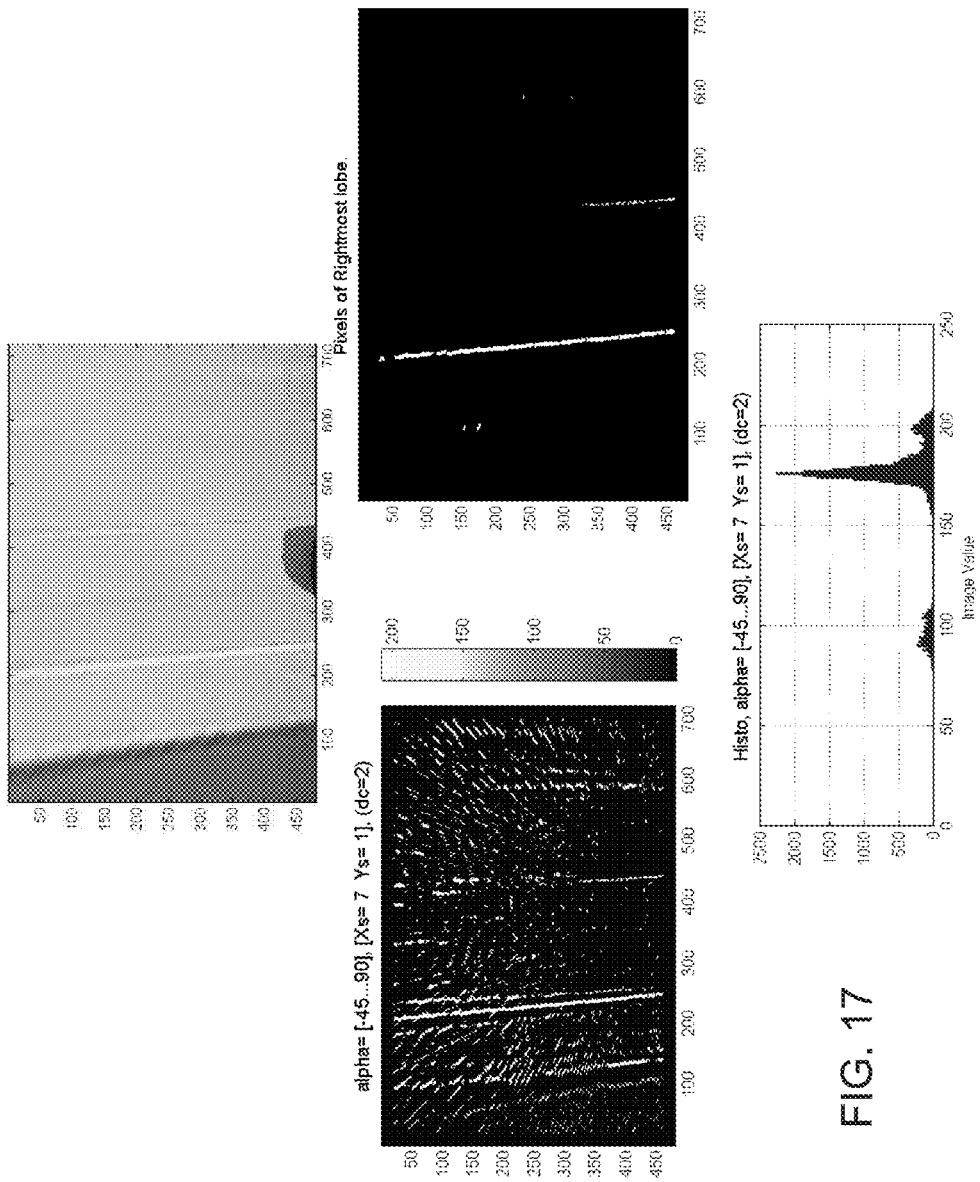

As shown in FIG. 2, the brightness profile of a white band is different than a black band line. In FIG. 3, a filiformity measure is applied to the profiles to measure the contrasts ($w_p$, $b_p$) in both sides, left and right side of a point p. In two dimensional (2D) images, the measures $w_p$, $b_p$ are taken over all angles to acquire the maximum value over a plurality of orientations or any orientation (see equation II in FIG. 4). The measured contrasts have different properties depending on the line (see FIG. 5).

A dll library may provide the three sets of pixels for central, right and left neighborhoods around each point of the image, and that may be used to compute the white line contrast value $w_p$. FIG. 6 shows some typical masks obtained for typical angles. As shown in FIG. 7, the library function takes three arguments: (1) alpha, the angle of the line profile, (2) mskX, the size of the mask in the x direction (along the alpha direction), and (3) mskY, the size along the y direction (perpendicular to the alpha direction). The results are used to obtain contrast images from top view images and corrected images (see FIGS. 8-17).

Figure 20:
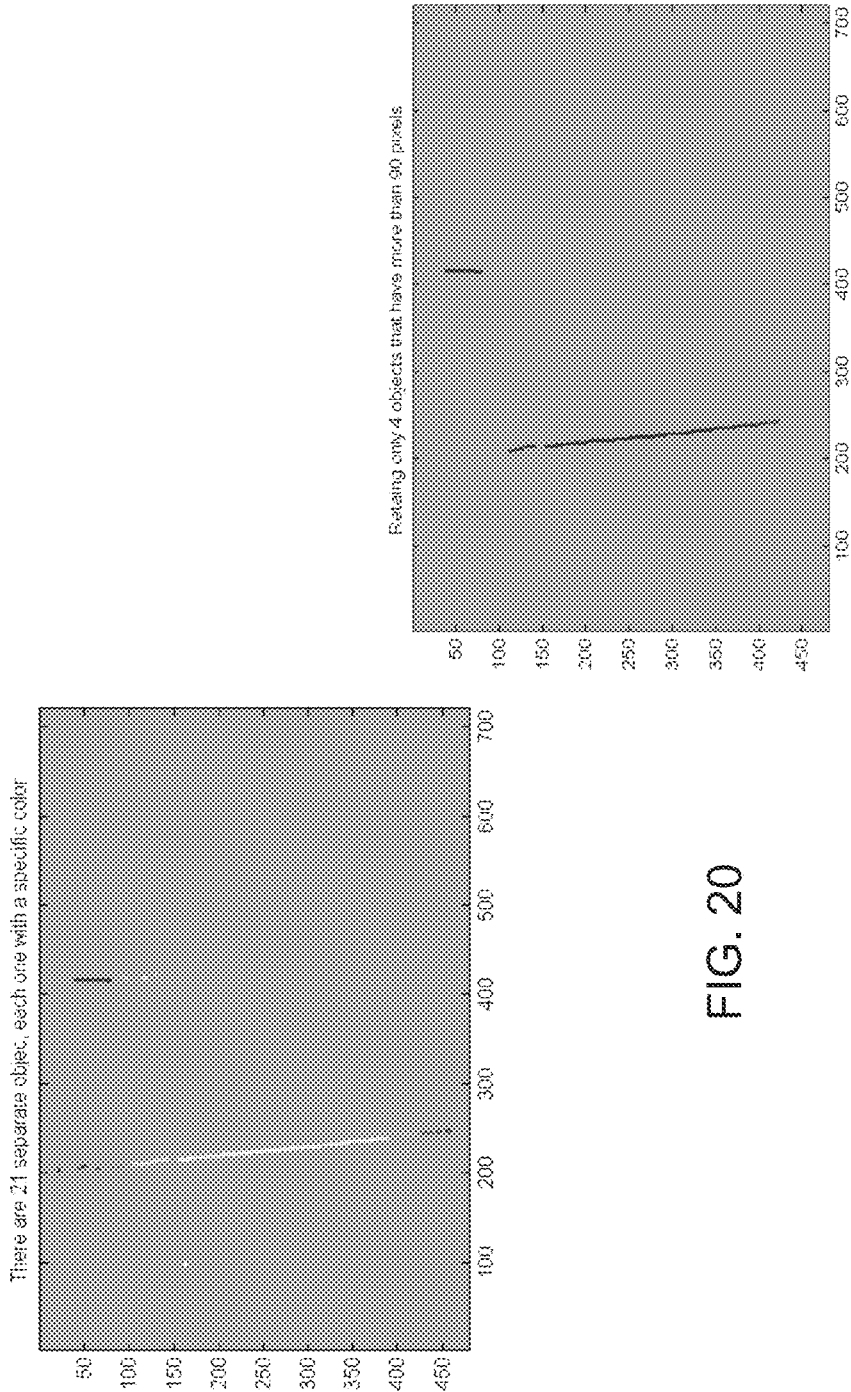
FIG. 20 shows examples of elimination of small edgels.

As an example, a synthetic image may be used that is composed of different lines having different thicknesses and different shapes (see FIG. 18). To detect the lines in the synthetic image, an adaptive filiformity measure may be used which determines only vertical lines. In processing edgels, after extracting pixels belonging to the rightmost lobe in the histogram, objects defined as sets of connected pixels are detected and labeled (using an algorithm and implementation), and objects with certain defaults are disregarded, such as objects having less than a certain amount of pixels, or objects where their bounding boxes are not that of an expected filiform object (such as the width and the height of the box have close values), or objects where the direction of the bounding box does not correspond to the expected direction that was fixed, or the like. The remaining edgels are set in groups to define lines that were being looked for in the context of LDW. An example of elimination of small edges is shown in FIG. 20.

Figure 24:
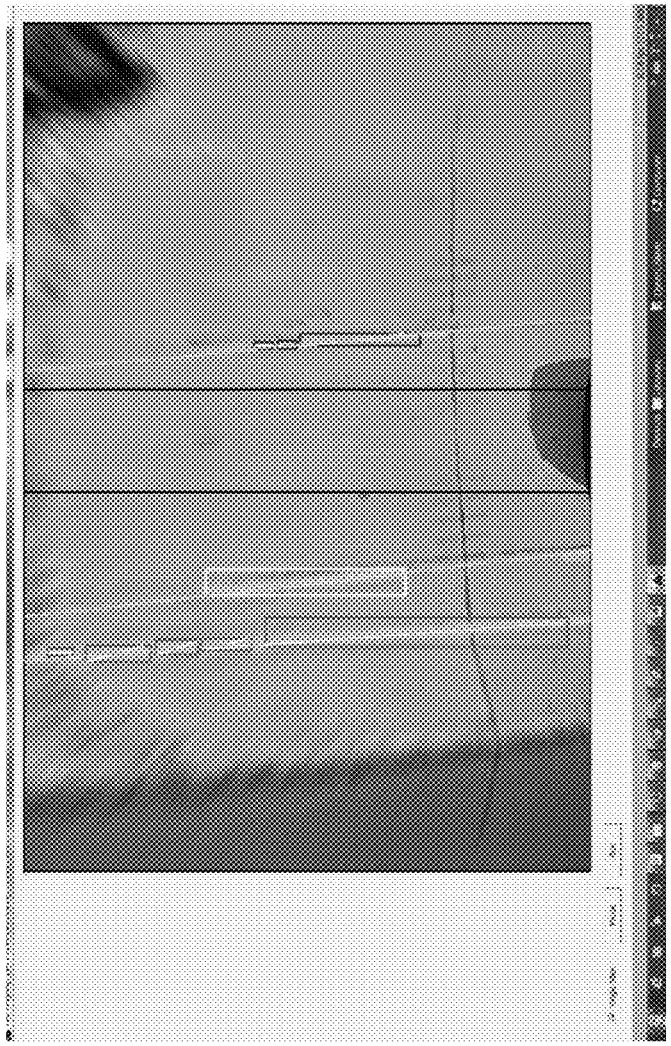
FIG. 24 shows how the regrouped edges are at lines of the captured image.

The system may process data to determine bounding boxes of edgels (see FIG. 21). As shown in FIG. 22, the direction of the lines on the road are derived by regrouping the edgels to form lines. The system approximates a group of edges by lines using linear regression considering pixels of all edges of the group (see FIG. 23). As shown in FIG. 24, three groups of lines may be determined, with each group of boxes in its own color (e.g., magenta on the left line, yellow on the middle line and blue on the right line). If no intersection of the lines is determined within the two vertical black lines, the lines may be shown as green (otherwise, if a line is determined to intersect one of the boundary vertical black lines, that region may be shown in red).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication Nos. US-2006-0061008 and/or US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878, 370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
    a camera configured to be disposed at a vehicle so as to have a field of view exterior of the vehicle;
    wherein said camera comprises a pixelated imaging array having a plurality of photosensing elements;
    an image processor operable to process frames of image data captured by said camera;
    wherein, with said camera disposed at the vehicle, said image processor is operable to determine lane markers on a road on which the vehicle is traveling;
    wherein said image processor processes intensity gradient information of captured image data to determine lane markers, and wherein, responsive to processing of intensity gradient information of captured image data, said image processor is operable to detect straight or curved lane markers;
    wherein said image processor processes intensity gradient information of captured image data to determine contrast values at both sides of a center region of a determined lane marker;
    wherein said image processor determines an angle of the determined lane marker relative to the vehicle responsive at least in part to the determined contrast values; and
    wherein said image processor is operable to adapt the processing of lane marker image data in subsequent frames of captured image data responsive to image processing of lane marker image data in previous frames of captured image data.

2. The vision system of claim 1, wherein said system compares the determined contrast values with contrast values stored in memory to determine the angle of the determined lane marker relative to the vehicle.

3. The vision system of claim 1, wherein, using the determined contrast values over a plurality of angles, said image processor determines a maximum contrast value over a plurality of orientations.

4. The vision system of claim 1, wherein said system utilizes a database of contrast values for central, left and right regions for typical angles of a lane marker segment relative to the direction of travel of the vehicle, and compares the determined contrast values with database contrast values to determine the angle of a determined lane marker segment relative to the vehicle.

5. The vision system of claim 4, wherein the database provides sets of pixels for central, right and left regions around each determined point of the determined lane marker segment.

6. The vision system of claim 1, wherein, responsive to processing of captured image data, portions of lane markers are grouped to determine the angle of the determined lane marker relative to the direction of travel of the vehicle.

7. The vision system of claim 1, wherein, responsive to processing of captured image data, lane marker segments are determined.

8. The vision system of claim 7, wherein a direction of lane markers on the road is derived by grouping determined lane marker segments to form lines.

9. The vision system of claim 8, wherein said vision system approximates a direction of a group of lane marker segments using linear regression.

10. The vision system of claim 1, wherein, responsive to processing of captured image data, determined lane marker segments are grouped within respective bounding boxes that encompass determined points along the determined lane marker segments.

11. The vision system of claim 10, wherein lane marker segments are grouped to determine a lane marker and a direction of the determined lane marker responsive to a determination that a gap between centers of adjacent bounding boxes is less than a width of the larger of both bounding boxes.

12. The vision system of claim 1, wherein said camera comprises a wide angle lens and wherein said camera has a wide angle field of view exterior of the vehicle.

13. A vision system of a vehicle, said vision system comprising:
    a camera configured to be disposed at a vehicle so as to have a field of view exterior of the vehicle;
    wherein said camera comprises a pixelated imaging array having a plurality of photosensing elements;
    wherein said camera comprises a wide angle lens and wherein said camera has a wide angle field of view exterior of the vehicle;
    an image processor operable to process frames of image data captured by said camera;
    wherein, with said camera disposed at the vehicle, said image processor is operable to determine lane markers on a road on which the vehicle is traveling;
    wherein said image processor processes intensity gradient information of captured image data to determine lane markers, and wherein, responsive to processing of intensity gradient information of captured image data, said image processor is operable to detect straight or curved lane markers;

wherein said image processor is operable to adapt the processing of lane marker image data in subsequent frames of captured image data responsive to image processing of lane marker image data in previous frames of captured image data;

wherein said image processor determines respective contrast values at both sides of a center region of a determined lane marker;

wherein, using the determined contrast values over a plurality of angles, said image processor determines a maximum contrast value over a plurality of orientations; and wherein said system utilizes a database of contrast values for central, left and right regions for typical angles of a lane marker segment relative to the direction of travel of the vehicle, and compares the determined contrast values with database contrast values to determine the angle of a determined lane marker segment relative to the vehicle.

14. The vision system of claim 13, wherein the database provides sets of pixels for central, right and left regions around each determined point of the determined lane marker segment.

15. The vision system of claim 13, wherein, responsive to processing of captured image data, portions of lane markers are grouped to determine the angle of the determined lane marker relative to the direction of travel of the vehicle.

16. The vision system of claim 13, wherein, responsive to processing of captured image data, lane marker segments are determined, and wherein a direction of lane markers on the road is derived by grouping determined lane marker segments to form lines.

17. A vision system of a vehicle, said vision system comprising:

a camera configured to be disposed at a vehicle so as to have a field of view exterior of the vehicle;

wherein said camera comprises a pixelated imaging array having a plurality of photosensing elements;

wherein said camera comprises a wide angle lens and wherein said camera has a wide angle field of view exterior of the vehicle;

an image processor operable to process frames of image data captured by said camera;

wherein, with said camera disposed at the vehicle, said image processor is operable to determine lane markers on a road on which the vehicle is traveling;

wherein said image processor processes intensity gradient information of captured image data to determine lane markers, and wherein, responsive to processing of intensity gradient information of captured image data, said image processor is operable to detect straight or curved lane markers;

wherein said image processor is operable to adapt the processing of lane marker image data in subsequent frames of captured image data responsive to image processing of lane marker image data in previous frames of captured image data;

wherein said image processor determines respective contrast values at both sides of a center region of a determined lane marker;

wherein said image processor determines an angle of the determined lane marker relative to the vehicle responsive at least in part to the determined contrast values;

wherein, responsive to processing of captured image data, lane marker segments are determined; and wherein a direction of lane markers on the road is derived by grouping determined lane marker segments to form lines.

18. The vision system of claim 17, wherein said vision system approximates a direction of a group of lane marker segments using linear regression.

19. The vision system of claim 17, wherein, responsive to processing of captured image data, determined lane marker segments are grouped within respective bounding boxes that encompass determined points along the determined lane marker segments.

20. The vision system of claim 19, wherein lane marker segments are grouped to determine a lane marker and a direction of the determined lane marker responsive to a determination that a gap between centers of adjacent bounding boxes is less than a width of the larger of both bounding boxes.

* * * * *